United States Patent [19]
Yrjölä et al.

[11] Patent Number: 5,521,561
[45] Date of Patent: May 28, 1996

[54] ARRANGEMENT FOR SEPARATING TRANSMISSION AND RECEPTION

[75] Inventors: Seppo Yrjölä, Oulunsalo; Panu Hagström, Oulu, both of Finland

[73] Assignee: LK Products Oy, Kempele, Finland

[21] Appl. No.: 386,018

[22] Filed: Feb. 9, 1995

[30] Foreign Application Priority Data

Feb. 9, 1994 [FI] Finland .................... 940602
Oct. 14, 1994 [FI] Finland .................... 944835

[51] Int. Cl.$^6$ .................. H01P 1/15; H04B 1/44
[52] U.S. Cl. .................. 333/103; 333/104; 455/80; 455/83
[58] Field of Search .................. 333/101, 103–105; 455/73, 78–80, 82, 83; 370/24, 32, 57, 58.1

[56] References Cited

U.S. PATENT DOCUMENTS

| | | | |
|---|---|---|---|
| 4,492,937 | 1/1985 | Theriault | 333/103 |
| 5,023,935 | 6/1991 | Vancraeynest | 455/80 |
| 5,054,114 | 10/1991 | Erickson | 333/101 X |
| 5,109,205 | 4/1992 | Hart et al. | 333/104 |
| 5,109,536 | 4/1992 | Kommrusch | 455/82 |
| 5,193,218 | 3/1993 | Shimo | 333/103 X |
| 5,230,090 | 7/1993 | Zametzer et al. | 455/83 |
| 5,241,693 | 8/1993 | Kim et al. | 455/82 |
| 5,285,177 | 2/1994 | Norose | 333/176 |
| 5,387,886 | 2/1995 | Takalo et al. | 333/101 |

FOREIGN PATENT DOCUMENTS

| | | | |
|---|---|---|---|
| 0526643A1 | 2/1993 | European Pat. Off. | H04B 1/18 |
| 0578160A1 | 1/1994 | European Pat. Off. | H01P 1/15 |
| 0578324A1 | 1/1994 | European Pat. Off. | H04B 1/48 |
| 90478 | 10/1993 | Finland | H01P 1/20 |
| 0575174A1 | 6/1993 | France | H01P 1/213 |
| 2709096A1 | 9/1977 | Germany | H04B 1/48 |
| 3506817A1 | 8/1986 | Germany | H04B 1/44 |
| 2257335 | 1/1993 | United Kingdom | H04B 1/48 |

OTHER PUBLICATIONS

Finnish Office Action for Application No. 944835 (with translation).

*Primary Examiner*—Paul Gensler
*Attorney, Agent, or Firm*—Darby & Darby

[57] ABSTRACT

The present invention relates to an arrangement for separating transmission and reception accomplished through one and same antenna (A) in a transceiver, said arrangement comprising a filter and a switching element (K) and being provided with a common port to be coupled to the antenna (A), a transmitter branch (TX) port (T) to be coupled to the transmitter of the transceiver and a receiver branch port (RX) port (R) to be coupled to the receiver of the transceiver, and in which, as a response to a control signal, the switching element couples operationally to the common port alternatively the transmitter branch port (T) and the receiver branch port (R). The arrangement comprises a filter ($S_T, S_F, S_1, S_2$) including transmission line resonators, said filter being provided with adaptation couplings to be coupled to the transmission line resonators and for accomplishing couplings between the transmission line resonators. The adaptation couplings comprise an impedance adaptation circuit comprised of discrete components for adapting the filter to the antenna. The switching element (K, $K_T$, $K_F$) includes parts of the adaptation couplings of the filter, whereby the switching element is connected to the filter utilizing the adaptation couplings thereof and said impedance adaptation circuit is arranged in the switching element to serve as a phase shifter.

15 Claims, 6 Drawing Sheets

ARRANGEMENT FOR SEPARATING TRANSMISSION AND RECEPTION

BACKGROUND OF THE INVENTION

The present invention relates to an arrangement for separating transmission and reception through an antenna in a transceiver. Such an arrangement can be employed to couple a transmitter/receiver of a radio apparatus to a common antenna in a mobile network based on TDMA, employing both FDD and TDD.

The great majority of the new mobile networks, and particularly those to be used in the future, are completely digital, and the network can be used for transferring various information. A mobile phone acting as a terminal of the network often employs the one and the same antenna for both transmission and reception. In such instances, various arrangements have to be adopted to ensure that a transmission will not enter the receiver and that a received transmission will not enter the transmitter.

In digital networks the TDM/TDMA principle is used, whereby transmission and reception are performed in different time slots. In such networks, if transmission and reception take place in different frequencies, a unit resembling the duplex filter used in analog networks can be used. Alternatively, if the transmission and reception frequencies are the same, an antenna switch (RF switch) can be used. In digital networks the FDM/FDMA principle is also used, whereby transmission and reception are accomplished in different frequency ranges, these being separated by a transition band. In such instances, a duplex filter can be used for signal separation.

Since the separation unit is the largest individual RF component of the terminal in items of volume and often also in mass, reducing its size, surface area and mass is desirable, in order to reduce the size of the mobile phone.

The function of a switch in an antenna switch structure is, while transmitting a signal, to couple the transmission port to the antenna while providing as low impedance and low loss signal path from the transmission port to the antenna port as possible. When transmitting a signal, the switch should appear to the receiver port as high impedance as possible, whereby the disturbance and spurious response signals are attenuated as efficiently as possible. When receiving a signal, the operation of the switch is reversed. The switch is then expected to couple the antenna port to the receiver port and offer as low impedance and low loss signal path as possible, and also, to attenuate signals towards the transmission port as efficiently as possible.

In a digital mobile phone employing Frequency Division Duplex, FDD, filters are needed, in addition to the RF switch, to separate reception and transmission and also to provide a sufficient selectivity and protection for the low noise preamplifier in the input of the receiver. At the output of the transmitter, harmonics of the output frequency must be attenuated, as well as other spurious transmissions such as mirror frequencies. In addition, there is often a need to filter noise generated by the transmitter chain to the receiver band. Similarly, attenuation of the frequencies below the transmission band has to be carried out with a separate filter. In a system employing time duplex, such as DECT, it is necessary to ensure by various measures, in addition to those described above, that when transmitting a signal, the spurious transmissions generated by the receiver towards the antenna are sufficiently attenuated.

Figure 1:
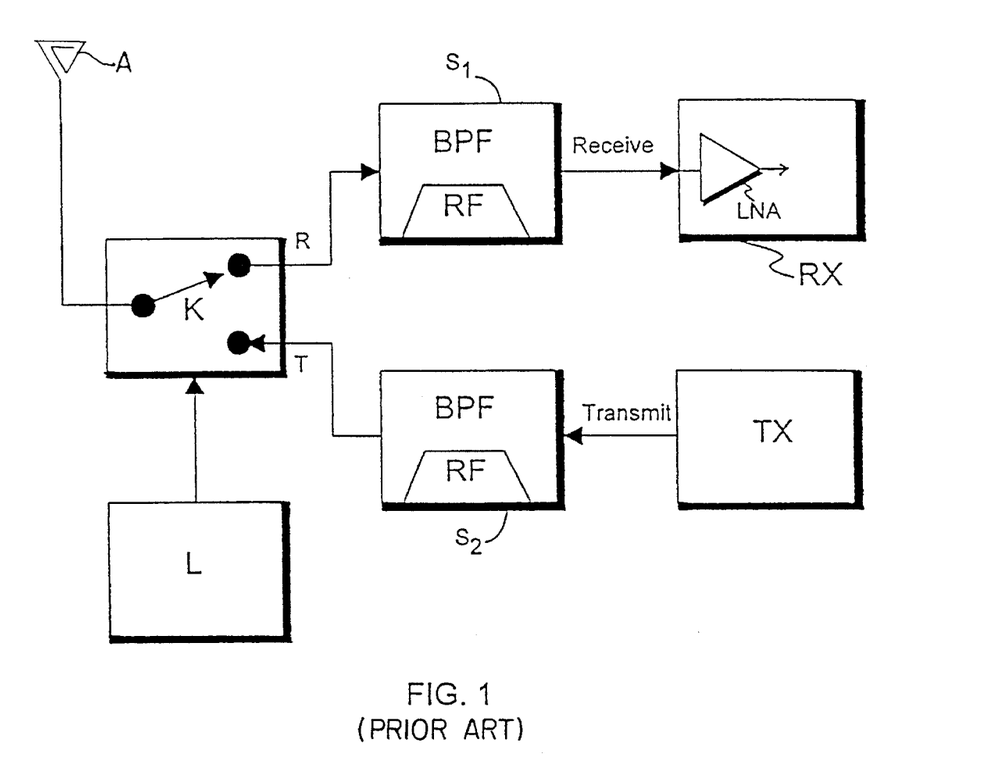
FIG. 1 presents a block diagram of a known RF antenna switch and its connection to a radio phone.

FIG. 1 presents a known switch arrangement in which an antenna A is coupled with a logic-controlled RF switch K to the input of the receiver branch and to the output of the transmitter branch of a mobile phone. The antenna switch arrangement also includes filters $S_1$ and $S_2$. When transmitting a signal, control logic L controls the switch K into position T. The filter $S_2$ arranged on the transmission branch attenuates the disturbance signals external to the transmission band, such as the harmonics of the output frequency and other distortions, leakage signals of oscillators, and other spurious transmissions, and filters noise external to the transmission band specifically in the reception band. When receiving a signal, the control logic controls the switch into position R. The filter $S_1$ on the reception side attenuates from a signal passing through antenna A disturbance signals external to the reception band and protects the sensitive low noise preamplifier LNA against strong transmitter signals. This filter $S_1$ also attenuates spurious transmissions outside the reception band propagating towards the antenna A in the other direction from the receiver RX.

U.S. Pat. No. 5,054,114 discloses this type of structure. Therein, a switch is produced with two PIN diodes. The transmitter is disposed in the antenna port with a wide band impedance adaptation circuit, and the isolation of the receiver is realized with a network which makes the zero impedance on the receiver side, produced when the PIN diode therein is conductive, appear in the antenna port as a high impedance. Here, the adaptation circuit and the network together form a bandpass filter implemented with discrete components or strip lines. No resonators are used.

The unit generally used in FDMA mobile phones for separating signals of different frequencies to be received and transmitted is a duplex filter which is also appropriate for a TDMA mobile phone. An advantage thereof is the single component of the structure when the discrete filters of the receiver and the transmitter are integrated into one. The duplex filters usually have good isolation and attenuation properties.

Figure 2:
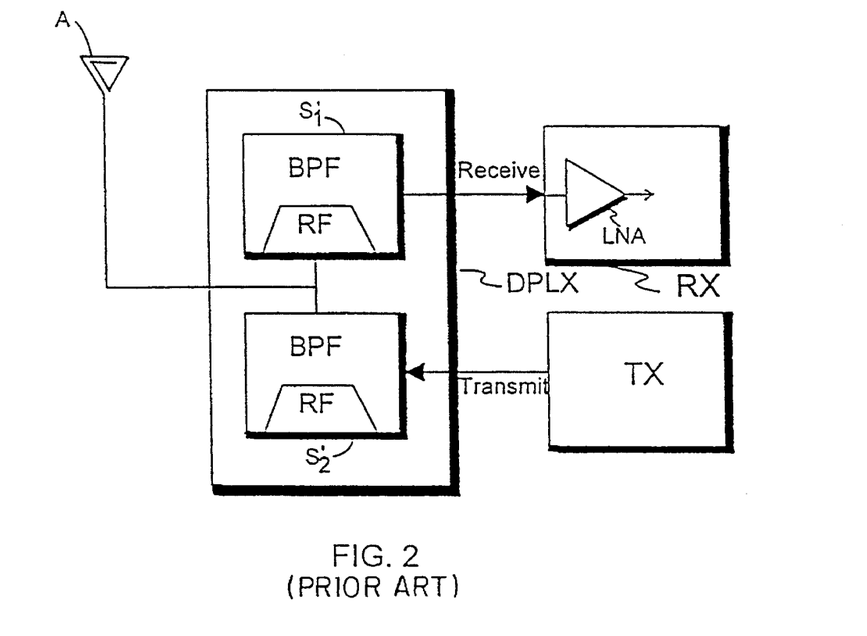
FIG. 2 presents the use of a duplex filter in a radio phone.

FIG. 2 presents a known arrangement based on duplex filter DPLX, in which a duplex filter is composed of two, typically passband filters $S'_1$ and $S'_2$. The transmission filter $S'_2$ in the reception band appears to the antenna as a very high impedance and the reception filter $S'_1$ has been adapted or matched to appear as being the magnitude of the antenna impedance. Likewise, due to the coupling together the receiver filter $S'_1$ appears in the transmission band to the antenna as a very high impedance and the transmission filter $S'_2$ is adapted or matched to the antenna impedance. The other functions of the filters $S'_1$ and $S'_2$ are the same as of the filters $S_1$ and $S_2$ of the apparatus presented in FIG. 1.

In the transmission band, the receiver filter $S'_1$ therefore appears to a signal at transmission frequency as a very high impedance, attenuating to an acceptable level the signal which enters the receiver. The transmission filter $S'_2$ functions likewise in the case of a reception frequency signal. The stop band attenuation requirement from the transmitter to the receiver in a digital TDMA mobile phone is of the order of 30 dB.

It is known in the state of art to combine an antenna switch and a filter within the one and the same structure. U.S. Pat. No. 5,023,935 discloses a design in which two adjacent quarter wave transmission lines serve as a filter, one end of one of said lines being connected to an antenna. The other transmission line has at one end been connected to the receiver and this end can be short circuited with a PIN diode. The other end has been connected to the transmitter through a reverse PIN diode. Using diodes and a transmission line, sufficient isolation is achieved, and, using parallel transmission lines connected electromagnetically together, a certain amount of filtering is obtained. However, with the design no high powers are achievable and the filtering properties are modest. A further drawback of the structure is great size. Therein, transmission lines being quarter wave in length are used, the length of which at 880 MHz frequency will be about 8.5 cm so that when the other switching elements are added the overall size will readily be about 20 mm×100 mm, which is far too much for a mobile phone.

SUMMARY OF THE INVENTION

An aim of the present invention is to provide an integrated structure of an antenna switch and a filter to offer a more compact configuration than a separate component implementation.

The present invention provides an arrangement for separating transmission and reception accomplished through an antenna in a transceiver, the arrangement comprising a filter, a switching means, a common port to be coupled to the antenna, a transmitter branch port to be coupled to the transmitter of the transceiver and a receiver branch port to be coupled to the receiver of the transceiver, wherein as a response to a control signal, the switching means operatively couples the common port to the transmitter branch port or the receiver branch port, wherein the filter includes resonators and adaptation couplings for coupling to the resonators, the adaptation couplings including an impedance adaptation circuit composed of discrete components for adapting the filter to the antenna, wherein the switching means includes said impedance adaptation circuit arranged in the switching means to serve as a phase shifter.

In known separating arrangements based on the RF switch approach, various impedance adaptation circuits and isolation circuits are needed between the switch and the transmitter/receiver. Even including those circuits, the filtering properties of the switch arrangements are poor compared with the properties achieved with a duplex filter. In known duplex filters, the couplings to the resonators and the couplings between the resonators are implemented by means of adaptation couplings provided by various transmission line structures and separate components.

In the present invention as set out above, transmission lines in filter couplings or adaptation circuits and discrete components are used to implement an RF switch together with a filter. The RF switch comprises, in addition to switch semiconductors, mainly filter transmission lines and adaptation circuits, including discrete components, provided therewith. Therefore, the only additional losses caused by the switch are due to the switch semiconductors used, such as PIN diodes, which is a remarkable improvement over the state of the art. The switch can be implemented by utilizing components already existing in the filter, such as coupling and impedance adaptation circuits. The phase shifter formed from an impedance adaptation circuit is composed of discrete components, whereby the phase shifter is small in size and the entire structure small and compact.

In accordance with the invention, the switch can be implemented in a number of ways using any divided and centralized circuit elements. The filter may comprise two filters of the duplex filter, that is, e.g. RX or TX separation filter, a low-pass filter in TX or a bandpass filter in RX. Alternatively, there may be one filter only through which both the reception signal and the transmission signal are conducted. In this way, a filter as simple and small in size as possible is provided.

The arrangement of the present invention may be used in TDMA/FDMA, TDMA/FDD, and TDMA/TDD systems. By combining an antenna switch and a filter according to the invention, the adaptation circuits and elements therebetween necessary in the known designs (FIG. 1) are dispensed with. Along with the exclusion of various transmission line structures and separate components used in adaptation circuits and elements, a wide variety of transmission line losses are also eliminated. In addition, an integrated RF switch/filter structure offers, as regards the performance, a more compact configuration compared with the structures described above, that is, one component on the circuit board of a phone.

Furthermore, with an integrated structure, better electric properties are achieved compared with separate component implementation. This is made possible by using components of the transmitter and receiver filters not only in a filtering role but also as part of the phase shifters inherently included in an RF switch.

Subsidiary features of the invention are given in the dependent claims.

BRIEF DESCRIPTION OF THE DRAWINGS

Exemplary embodiments of the invention are described below in detail by referring to the accompanying drawings, in which.

DESCRIPTION OF THE PREFERRED EMBODIMENT

Figure 3A:
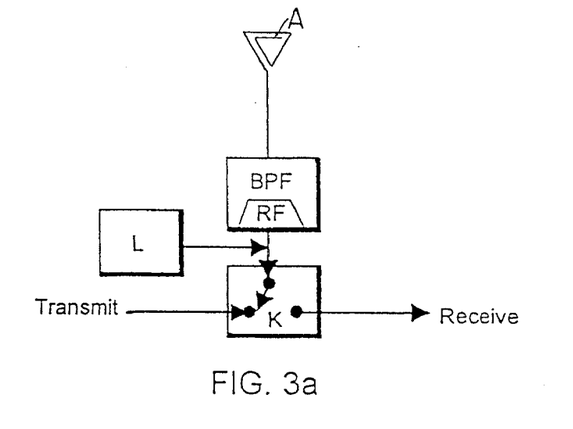
FIG. 3a presents a block diagram of the use of an RF switch and a filter as separate blocks.
Figure 3B:
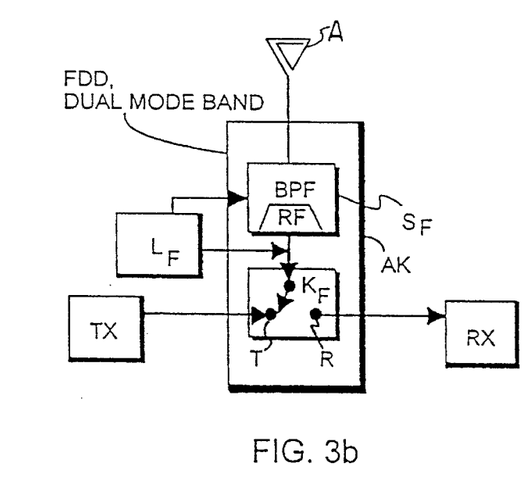
FIG. 3b presents schematically according to the invention a block diagram of the front end of an apparatus employing an RF switch filtering structure.
Figure 3C:
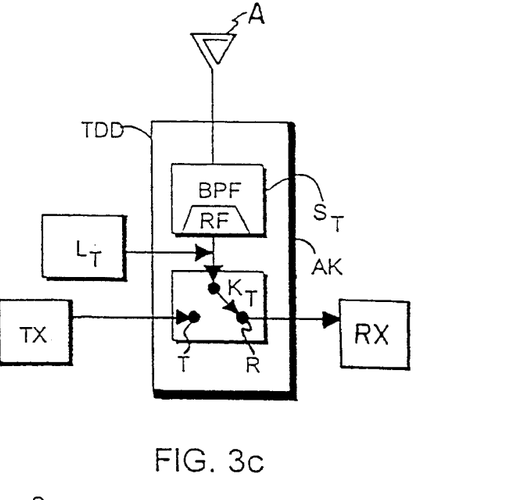
FIG. 3c presents schematically according to the invention another block diagram of the front end of an apparatus employing an RF switch filtering structure.

FIG. 3a is a block diagram of a prior art RF switch including separate switching and filter circuitry. In FIGS. 3b and 3c, an RF switch or switching means $K_T$, $K_F$ and filter $S_T$, $S_F$ are presented integrated into one antenna switch block AK according to the invention. When a signal is transmitted in TDMA/FDD system (FIG. 3b), the control logic $L_F$ controls the signal through filter $S_F$ to position T of the RF switch $K_F$. The nominal frequency of filter $S_F$ is now equivalent to the transmission frequency of the system. Now, the RF switch $K_F$ appears to a signal to be transmitted as a low-impedance signal path to the transmission port. With the switch in position T, the filter $S_F$ appears to antenna A as being of the size of the antenna impedance, the filter having been adapted thereto. In TDMA/TDD system (FIG. 3c), when a signal is transmitted, the control logic $L_T$ controls the RF switch into position T and couples the signal via the fixed-frequency filter $S_T$ and the RF switch $K_T$ to the antenna. When transmitting the signal, the RF switch $K_T,K_F$ appears both in design of FIG. 3b and FIG. 3c as a very high impedance to the reception port, thereby attenuating the signal. The attenuation of RF switch $K_T,K_F$ may in the course of a transmission vary, according to the switch type and the configuration, within the range 10 to 70 dB.

When receiving a signal in a design as in FIG. 3c in TDMA/TDD system, the control logic $L_T$ directs the signal through filter $S_T$ to RF switch $K_T$, this being in position R. When receiving a signal using the design according to FIG. 3b in a TDMA/FDD system, the nominal frequency of the resonators of filter $S_F$ is changed with control logic $L_F$ to correspond to the reception frequency by changing the frequency of the resonators. Changing the frequency of the resonators from the transmission frequency to the reception frequency of the system can be implemented using any suitable prior art technique. In a time division multiple access system the control logic $L_F$ controls the RF switch $K_F$ into position R and couples the signal through filter $S_F$ and RF switch $K_F$ to reception port RX. In FIG. 3b and FIG. 3c, the RF switch $K_T,K_F$ appears to a signal being received as a low-impedance and low-reflecting signal path to the reception port RX. When receiving a signal, the RF switch $K_T,K_F$ appears to the transmission port as a very high impedance, thereby attenuating the signal. Attenuation of the RF switch $K_T,K_F$ may vary, according to the switch type and the configuration, in the range 10 to 30 dB. A structure comprising separate blocks as shown in FIG. 3a is encumbered with the drawbacks of separate component implementation when compared with the design of FIGS. 3b and 3c.

Figure 4:
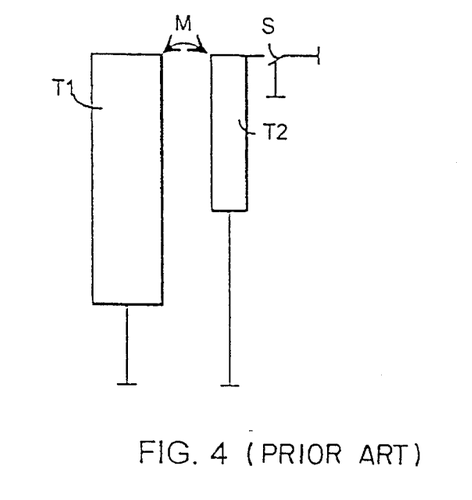
FIG. 4 presents a method known in the art for changing the frequency of a resonator.

FI 88442 discloses one known method of changing the resonant frequency of a resonator. The disclosure of this document is now briefly summarized with reference to FIG. 4. In FIG. 4 reference T1 designates a main resonator which can be of any known type, such as helix, coaxial, dielectric or strip line resonator. Said resonator has a given resonant frequency f. In its electromagnetic field a strip line T2 is positioned which is open at the upper end and the lower end can be short circuited with a switch S. Coupling M affects between the resonators. When the switch is open, the strip line acts as a half-wave resonator (λ/2resonator) which has a given resonant frequency $f_o$. Owing to the dimensions of the strip, said resonant frequency $f_o$ is at such distance from the resonant frequency f of the main resonator T1 that the side resonator T2 in said mode has hardly any effect on the resonant frequency f of the main resonator T1. When the switch S is closed, it short circuits one end of the strip, whereby it becomes a quarter-wave resonator (λ/4 resonator) with $f_o/2$ resonant frequency, which is thus higher than f. The coupling M causes that the resonant frequency of the main resonator T1 shifts downwards by Δf. The magnitude of said shift Δf can be effected as desired by selecting the resonant frequency $f_u$ of the side resonator T2 and the coupling M appropriately. The coupling M is determined by the mutual location of the resonators. FI 90926 discloses another known method.

Figure 5:
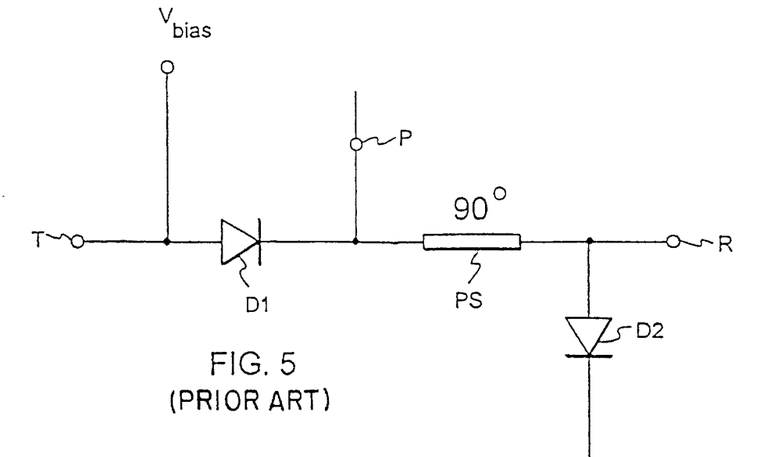
FIG. 5 presents a known antenna switch structure.

FIG. 5 presents a generalized RF switch structure or switching means, which in a more specific form is known, implemented with PIN diodes. An RF switch structure shown in FIG. 5 can, according to the invention, be integrated into a filter. Different RF switches can be used. When a signal is transmitted, both PIN diodes D1 and D2 of an RF switch according to FIG. 5 are forward biased by the aid of biasing voltage $V_{bias}$. Hereby, the PIN diode D1 connected in series appears to a signal travelling to antenna A as a low-impedance signal path and the parallel connected PIN diode D2 short circuits efficiently the antenna port at the base of the reception port R, preventing in this way overloading and protecting the sensitive low-noise preamplifier (LNA FIG. 1) against a powerful transmitter signal. The antenna and receiver port R can be isolated in the course of transmission mode by changing the low impedance 90° phase shift of the parallel-connected PIN diode D2 with the aid of a phase shifter PS to high impedance. It is to be noted that LC low pass structures are in general used as coupling elements between the resonators of a stop band filter implemented with transmission line resonators, which structures can be utilized according to the invention as part of the RF switch in the form of a phase-shifter PS. The LC low pass structures form a low pass filter also for filtering the harmonics generated by the transmitter.

Figure 5B:
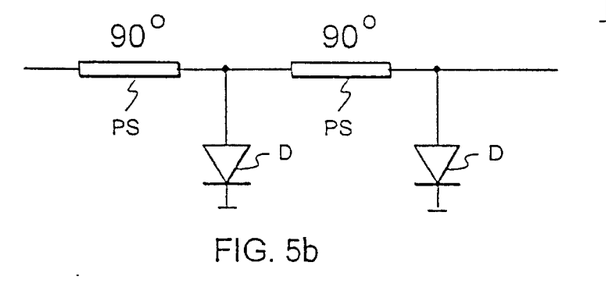
FIG. 5b presents the antenna switch structure of FIG. 5 having additional signal isolation circuitry.

According to the application, requisite isolation can be added, for instance by increasing the number of parallel connected PIN diodes of the receiver branch of the RF switch by coupling them at quarter-wave spacings to each other as shown in FIG. 5b.

When receiving a signal, both PIN diodes D1 and D2 have been biased in zero or reverse direction and appear to a signal to be received as low capacitance creating a low-impedance and low-loss signal path from antenna A to receiver port R. The transmission port T has in the course of receiving the signal been isolated from the antenna port A from the high impedance due to biasing in zero or reverse direction of the series-connected PIN diode D1 of the transmission branch of the RF switch.

The structure thus described in no way limits the structure of the RF switches to be used in the invention, instead, the RF switch can be a series-series, parallel-parallel type PIN diode switch familiar to a person skilled in the art, being controllable with one or more biasing voltages. The method of implementing an RF switch is neither limited merely to switches implemented with PIN diodes, but it can be implemented e.g. using GaAs techniques. The RF switch can be integrated on the same base also with a SAW filter, the common structure thereof, when encapsulated and possibly hermetically closed, forms an extremely small and compact component.

Figure 6:
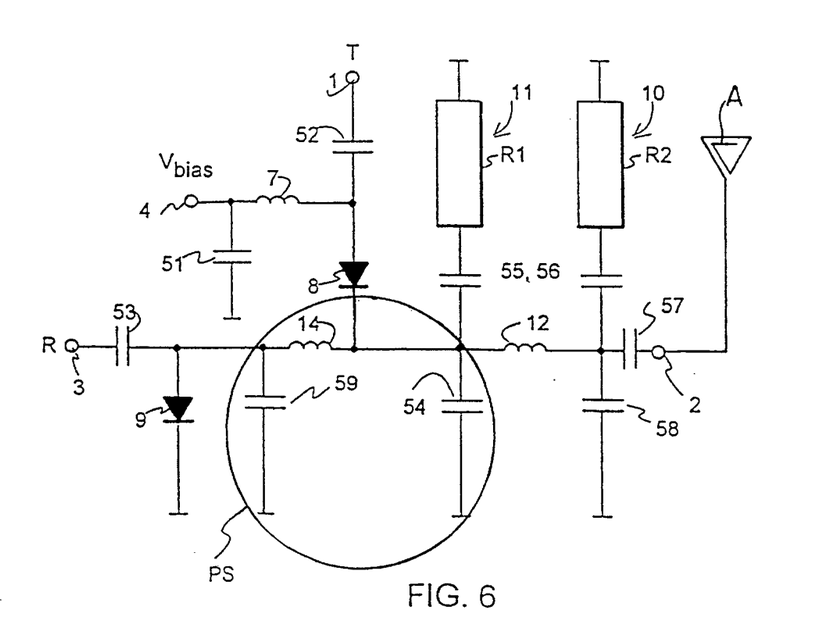
FIG. 6 presents an antenna switch structure known in the art shown in FIG. 5, integrated as part of the filter according to the present invention.

FIG. 6 presents an antenna switch as in FIG. 5, integrated to a filter according to the invention. The band stop structure of resonators R1 and R2 has the same functions in transmitting and receiving signals as the transmission filter S2 and receiver filter S1 shown in FIG. 1 when their frequencies have been changed to meet the modes of each of them. Respectively, the antenna switch formed by the PIN diodes and the transmission lines of the filter and the separate components have the same functions as the antenna switch shown in FIG. 5.

When transmitting a signal, the control logic $L_T,L_F$ (shown in FIGS. 3b and 3c) directs positive voltage to port 4, whereby both of the PIN diodes 8,9 are forward-biased. The signal passes now through the transmission port 1 to the antenna through resonators 10 (R2),11 (R1) and a bandpass filter formed by capacitors 54 to 58 and a coil 12. The signal will not enter the reception port 3 because the low forward resistance of one of the PIN diodes 9 becomes high (the signal attenuates by about 30 dB) with the aid of a 90° phase-shifter PS formed by capacitors 54,59 and coil 14. The phase shifter is formed from the impedance adaptation circuit 14,54,59, a filter the presence of which is also necessary to match the impedance of the antenna. The phase shifter is formed from discrete components in order to provide a small compact size.

When receiving a signal, the control logic directs to port 4 a zero bias. Both of the diodes 8,9 are now reverse biased. Then the signal passes through the antenna A via the bandpass filter to the reception port 3 because the impedance of the transmission port appears to the signal very high because of the PIN diode 8.

The added number of components required by the antenna switch can be minimized by an arrangement of the invention since the transmission lines and capacitors existing in the filter can be made use of in implementing the phase-shifter PS and requisite transmission lines. The additional components required by the antenna switch are a bias port 4, a current restriction resistor 6 (only shown in FIGS. 7 to 9), a choke 7, PIN diodes 8,9, and capacitors 51 to 53. The phase-shifter PS composed of capacitors 54,59 and a coil 14 already exists in the filter as impedance matching means, so that a saving in the number of components is achieved in comparison with the structure realized from a separate filter and an antenna switch as shown in FIG. 3a. The other components in the filter include resonators 10,11 and capacitors 54 to 59, and a coil 12.

Different types of filters based on different resonators can be used. When high outputs and high frequencies are in question, it is preferred to use a filter based on helical or ceramic transmission line resonators. Also e.g. a SAW filter or a strip line filter could be considered, by forming the resonators 10 and 11 as strip line resonators, see the SAW filter 15 in FIG. 8, or the dielectric resonators in FIG. 7. Filters of other types may also be used. It is mentioned above that the stop band attenuation from the transmitter to the receiver is of the order 30 dB. The strip band attenuation requirement in analog phones is typically 60 dB. If the isolation, such as 20 dB, obtainable even with a simple RF switch is acceptable, fewer resonators can be used in filters of TDMA/FDD and TDMA/FDMA systems, whereby the size of the filter diminishes. For instance, one may estimate that when ceramic resonators are used in a filter, the volume of the entire antenna switch A would be significantly below one cubic centimeter.

Figure 7A:
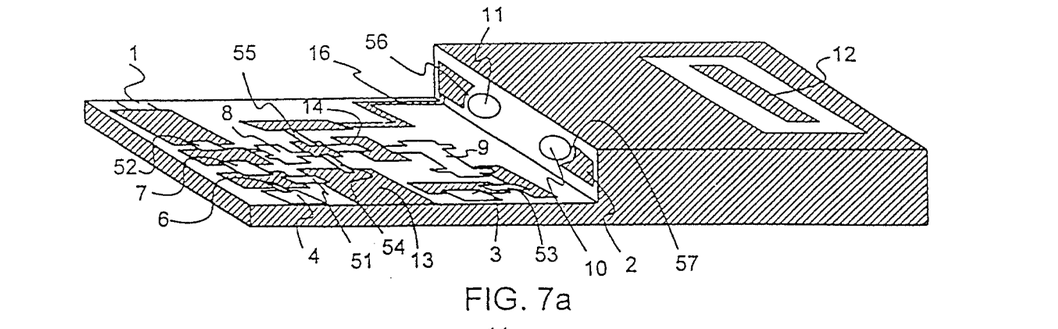
FIG. 7a presents an implementation of the circuit diagram shown in FIG. 6 in a dielectric filter.
Figure 7B:
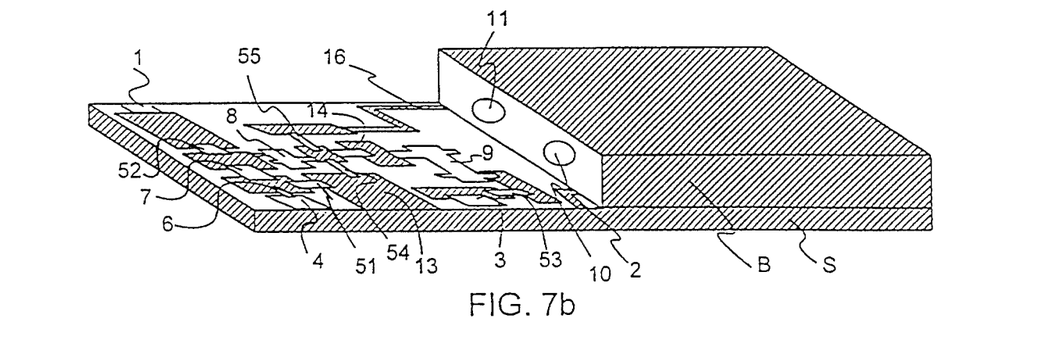
FIG. 7b presents another implementation of the circuit diagram shown in FIG. 6 in a dielectric filter.
Figure 7C:
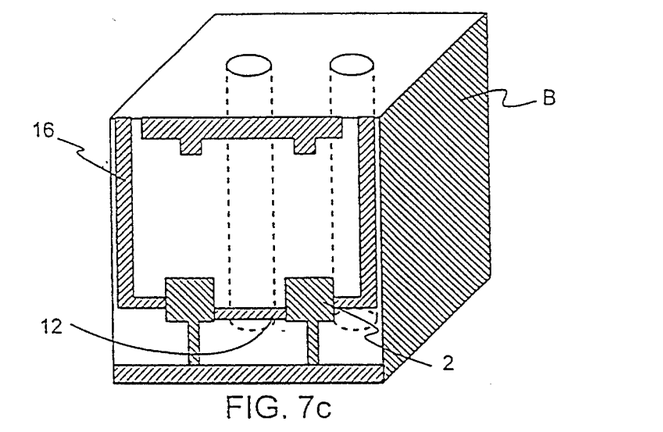
FIG. 7c presents the lower surface of a resonator block shown in FIG. 7b.

FIG. 7a presents a principle implementation of the circuit diagram shown in FIG. 6 as a dielectric filter, comprising of a block of dielectric material in which the resonators have been formed as holes extending through the block, the holes being coated with a conductive material. The arrangement shown in FIG. 7a is not completely identical with FIG. 6 as regards the circuit but it illustrates the main features of the embodiment. The dielectric block is to a large extent coated with a conductive material, with the exception of the surface of the block to which the so-called open high-impedance end of the resonators opens. In the Figure the surface is presented as a surface on which the resonator holes 10,11 are provided. The lower end of the resonator holes in which the coating of the holes is connected to the coating of the block is not shown. In FIG. 7a, the other components of FIG. 6 have, except the resonators, been formed with the aid of transmission lines (lined parts) and discrete components (e.g. surface mount devices), shown in the figure as light blocks. The coupling pad 13 is connected to the coating of the block, that is, it serves as a grounding plane. Coil 12 has been provided on a side surface of the ceramic block. Also the rest of the circuit layout and components could equally be formed on a side surface of the ceramic block. FIGS. 7a and 7c present more in detail an embodiment in which coupling to the resonators is accomplished from a side surface of the resonator block B, and substantially the other circuit layouts have been arranged on a separate base S, this being a ceramic substrate, a Teflon substrate, or a circuit board of some other material. In an embodiment as in FIGS. 7b and 7c also the side surface of the resonator block B including circuit layouts is, in addition to the upper surface of the resonator block, substantially uncoated, expect the circuit layouts. The layouts for coupling to the resonators are left between the resonator block B and the base S, not being therefore shown in FIG. 7b. The layouts are presented in more detail in FIG. 7c showing resonator block B of FIG. 7b (the figure is not necessarily dimensionally accurate) when viewed from the side surface of the block, which in FIG. 7b is downwards against the base S. So, the strip line 16 passing on the base is connected to strip line 16 passing in the block shown in FIG. 7c, and is coupled to the resonator. Coupling from a resonator to the antenna is accomplished via the coupling pad 2 from which the signal is conducted along the strip line to the base to strip line 2, FIG. 7b. The invention is in no way limited to the embodiments presented in FIGS. 7a to 7c, instead, its purpose is to demonstrate the advantages to be gained through the use of the invention.

Figure 8:
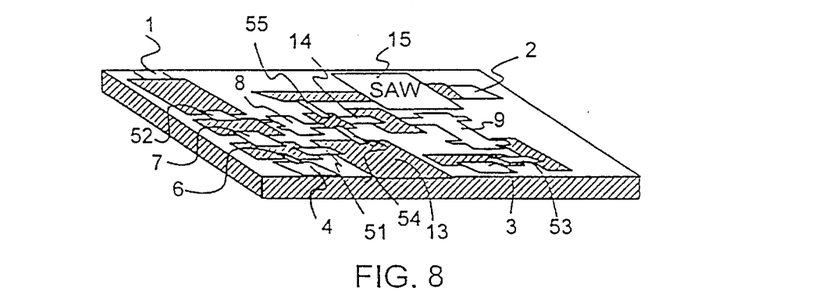
FIG. 8 presents an implementation of the circuit diagram shown in FIG. 6 in association with a SAW filter.

FIG. 8 presents an equivalent implementation as in FIGS. 7a and 7b, but for the filter, a Surface Acoustic Wave filter SAW is used. The SAW filter 15 can be immersed in the same substrate in which the other components and circuit configurations lie, e.g. in the manner disclosed in U.S. Pat. No. 5,254,962.

Figure 9:
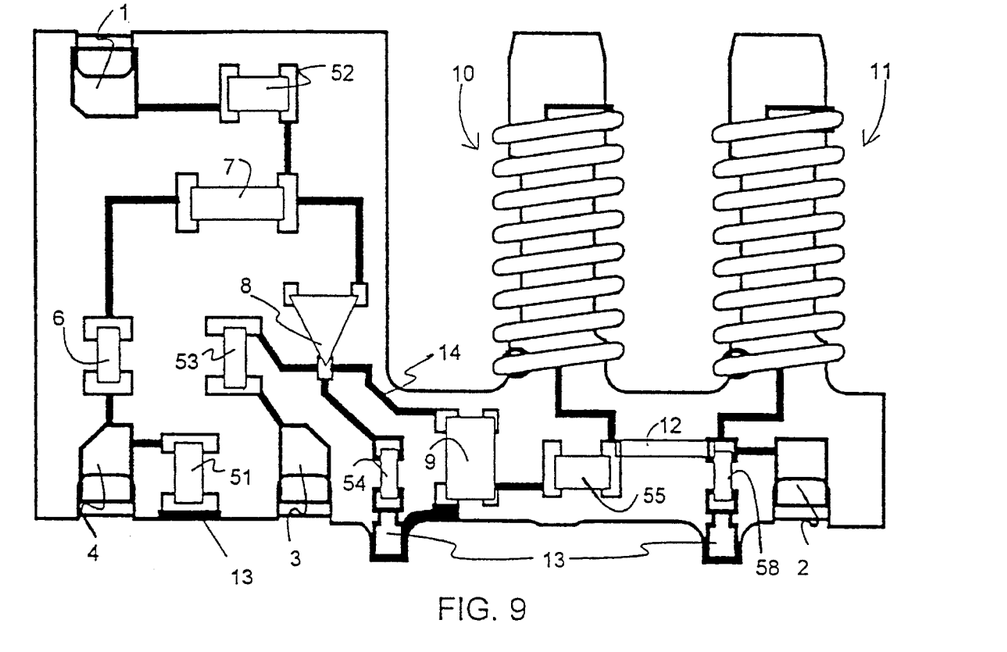
FIG. 9 presents an implementation of the circuit diagram shown in FIG. 6 in a helix filter.

FIG. 9 presents an embodiment of the coupling shown in FIG. 6 in a helix filter. The helix resonator of the filter can be implemented as a so-called finger support structure (or comb structure), disclosed e.g. in Fl 80542. Hereby, the resonators 10,11 have been formed from a metal wire wound into cylindrical coil around a projection out of the isolation plate. In the lower part of the isolation plate an electrical circuit, has been formed from discrete components, e.g. surface connection components, and strip lines. It is simple to add into the isolation plate the strips and components needed for an antenna switch, whereby a compact, combined structure of an antenna switch and filter according to the present invention is provided. In the figure, several of the components 6 through 9, 12, 51 through 58 are illustrated as surface mount devices soldered onto coupling pads.

Figure 10:
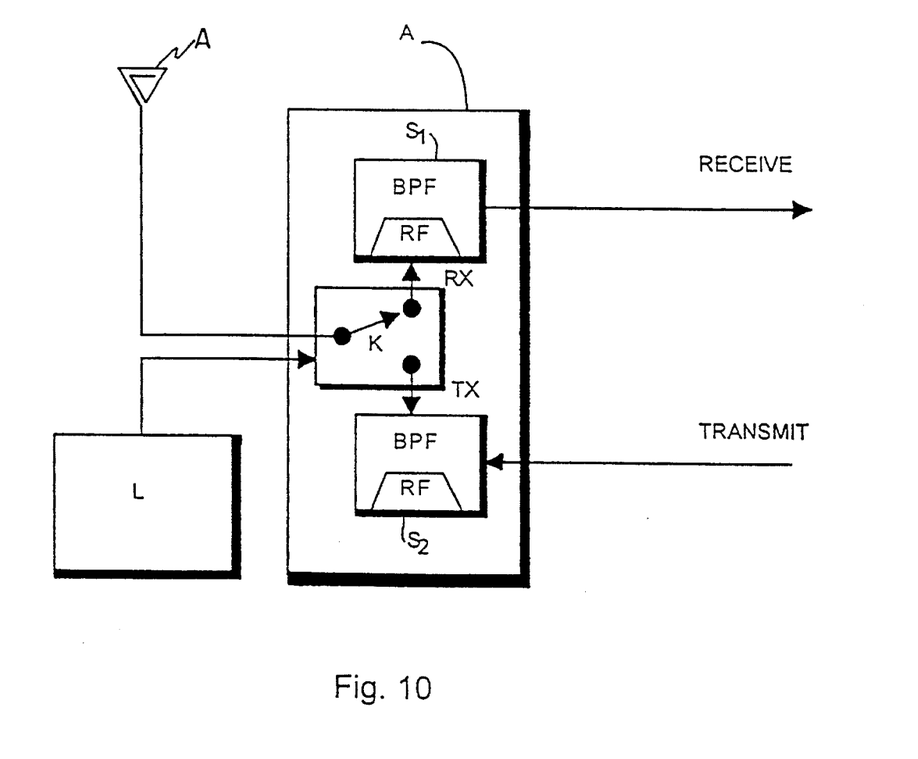
FIG. 10 presents the front end of an apparatus employing an embodiment of the invention.

FIG. 10 presents another embodiment according to the invention, in which according to the invention an RF switch K and filters S1 and S2 have been integrated into one antenna switch block A. When transmitting a signal, the control logic L controls the RF switch to position TX. Hereby, the RF switch appears to a signal being transmitted as a low-impedance signal path to the TX port. When the switch is in position TX, the transmission filter S1 appears to the antenna to have the same impedance as the antenna, the filter S1 having been adapted thereto. Thanks to the coupling together, the receptor filter S2 in the transmission band appears to the antenna as a very high impedance, attenuating the signal which enters the receiver to an acceptable level. When transmitting a signal, the RF switch appears to the RX port as a very high impedance, while attenuating further the signal. The attenuation of the RF switch may vary, according to switch type and configuration, in the range 10 dB to 50 dB.

When receiving a signal, the control logic controls the RF switch into position RX. Hereby, the RF switch appears to a signal being received as a low-impedance and low-reflecting signal path to the RX port. When the switch is in position RX, the receiver filter S2 appears to the antenna to have an impedance equal to that of the antenna, the filter S2 having been adapted thereto.

Figure 11:
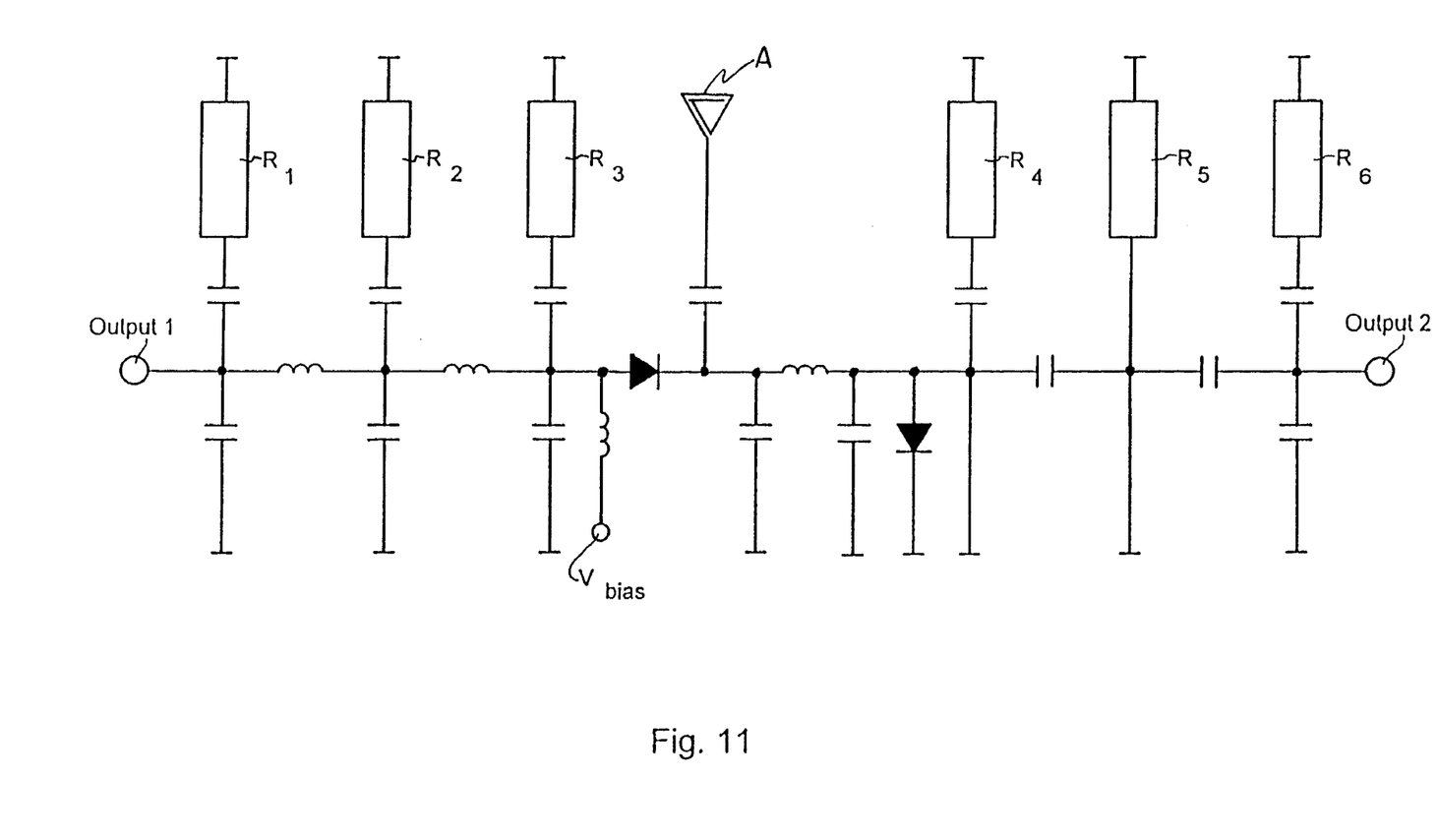
FIG. 11 presents another embodiment of the invention integrating the switch structure as shown in FIG. 5.

FIG. 11 presents an embodiment of the block diagram shown in FIG. 10 as a coupling in which an antenna switch as shown in FIG. 5 has been integrated into an arrangement according to the invention. The stop band filter structure formed by resonators R1 to R3 has the same functions when transmitting and receiving a signal as the transmission filter S2 shown in FIG. 1. Likewise, the pass band filter structure formed by resonators R4 to R6 has the same functions as the receiver filter S1 shown in FIG. 1. The antenna switch comprises PIN diodes, the transmission lines and separate components analogous functions to those show in FIG. 4.

The embodiment of the invention presented in FIGS. 10 and 11 can be used in subscriber apparatus of a system based on digital TDMA, the apparatus operating according to either the full duplex or half duplex principle, such as hand-held phones provided with a separate antenna or an antenna in association with the housing, in vehicle phones, and portable phones.

Using an integrated RF switch filtering structure according to the invention as an antenna switch for a radio phone of TDMA/FDD system, the good isolation and filtering properties of the conventional duplex filter can be maintained while both the volume of the antenna switch and the surface area required of the circuit board of the phone is reduced. In addition, in comparison with the RF switch design, the number of components loaded on the circuit board is reduced. The integrated structure according to the invention may also be used in future dual-mode phones in which particular readiness for operation is required of the phone both in TDMA/FDD and TDMA/TDD principle. Particularly significant is the use of an arrangement like one described in the present invention along with introduction of networks with short duplex spacings. Hereby, construction of conventional passive duplex filters in an appropriate volume becomes impossible.

The present invention is not limited to any given application, and it can be employed in filters in various applications and in different frequencies and in different multiple access methods, preferredly in radio frequencies, such as UHF and VHF. The design of the invention can be used in subscriber apparatus of a system based on digital TDMA/FDMA, TDMA/FDD or TDMA/TDD, TDMA/full or half-duplex, provided with a separate antenna or one in conjunction with the housing, in car phones or hand-held phones.

What is claimed is:

1. An arrangement for separating transmission and reception accomplished through an antenna in a transceiver, the arrangement comprising a filter coupled to the antenna, a switching means coupled to the filter, a common port to be coupled to the antenna, a transmitter branch port to be coupled to the transmitter of the transceiver and a receiver branch port to be coupled to the receiver of the transceiver, wherein as a response to a control signal, the switching means operatively couples the common port to the transmitter branch port or the receiver branch port, wherein the filter includes transmission line resonators and an impedance matching circuit for coupling to the resonators, the impedance matching circuit is composed of discrete components for matching the antenna impedance with the filter impedance, wherein the switching means includes said impedance matching circuit arranged to function as a phase shifter.

2. An arrangement according to claim 1, comprising one filter only, provided with a given pass range and being common to both transmission and reception.

3. An arrangement according to claim 1, comprising control logic, by which the frequency range of the filter can be controlled.

4. An arrangement according to claim 1, wherein the phase shifter is a 90 degree phase shifter.

5. An arrangement according to claim 4, comprising one or more phase shifters arranged in the switching means between the common port and the receiver branch port.

6. An arrangement according to claim 1, comprising one or more phase shifters arranged in the switching means between the common port and the receiver branch port.

7. An arrangement according to claim 1, wherein the switching means comprises a first switch between the transmitter branch port and the common port and a second switch between the common port end of the receiver branch port and ground, whereby the switches, while open, connect the receiver branch port to the common port and while closed, the transmitter branch port to the common port.

8. An arrangement according to claim 7, characterized in that, between the second switch and the common port a 90 degree phase shifter is provided.

9. An arrangement according to claim 7, wherein the first an second switches are PIN diodes.

10. An arrangement according to claim 1, characterized in that the resonators are helix resonators.

11. An arrangement according to claim 1, wherein the filter includes a SAW filter.

12. An arrangement according to claim 1, wherein the switching means comprises PIN diodes connected in series with said control signal.

13. An arrangement according to claim 1, wherein the switching means comprises PIN diodes connected in parallel with said control signal.

14. An arrangement according to claim 1, characterized in that the resonators are dielectric resonators.

15. An arrangement according to claim 1, characterized in that the resonators are strip line resonators.

* * * * *